United States Patent [19]

Arbogast

[11] Patent Number: 4,476,853
[45] Date of Patent: Oct. 16, 1984

[54] SOLAR ENERGY RECOVERY SYSTEM

[76] Inventor: Clayton C. Arbogast, 1503 Desmet, Sheridan, Wyo. 82801

[21] Appl. No.: 424,868

[22] Filed: Sep. 28, 1982

[51] Int. Cl.³ .................................................. F24S 3/02
[52] U.S. Cl. ..................................... 126/425; 126/435; 126/437; 126/438; 60/641.8; 60/641.15
[58] Field of Search .......................... 60/641.8, 641.15; 250/203 R; 126/425, 435, 437, 438

[56] References Cited

U.S. PATENT DOCUMENTS

| | | | |
|---|---|---|---|
| 2,942,411 | 6/1960 | Hutchings | 60/641.8 |
| 3,508,061 | 4/1970 | Hakata et al. | 250/203 R |
| 3,995,429 | 12/1976 | Peters | 60/641.8 |
| 4,018,532 | 4/1977 | Fletcher et al. | 250/203 R |
| 4,031,385 | 6/1977 | Zerlaut et al. | 126/425 |
| 4,079,591 | 3/1978 | Derby et al. | 60/641.8 |
| 4,108,154 | 8/1978 | Nelson | 126/425 |
| 4,147,154 | 4/1979 | Lewandowski | 126/425 |
| 4,205,659 | 6/1980 | Beam | 126/425 |
| 4,290,411 | 9/1981 | Russell | 250/203 R |
| 4,423,599 | 1/1984 | Veale | 60/641.8 |

FOREIGN PATENT DOCUMENTS

2075608  11/1981  United Kingdom ............... 60/641.8

Primary Examiner—Samuel Scott
Assistant Examiner—Helen Ann Odar
Attorney, Agent, or Firm—Klaas & Law

[57] ABSTRACT

A solar tracking system for a sun sensitive system such as a solar energy generating unit is described. Means for tracking the sun in bright sunlight and in cloudy conditions having a sun sensing mode and a blind mode are disclosed. Solar energy generating units compatible with the solar tracking system capable of automatically operating a stock watering system are also disclosed.

1 Claim, 8 Drawing Figures

SOLAR ENERGY RECOVERY SYSTEM

BACKGROUND OF THE INVENTION

The present invention relates generally to solar energy recovery systems and more specifically to solar energy recovery systems employing a solar tracking system to increase the operating efficiency of an associated solar energy generating unit.

In recent years a great deal of attention has been focused on the use of solar energy as a safe and clean alternative to the use of energy provided by fossil fuels and other means. Radiant energy from the sun may be converted to a useful energy form such as electricity or longer wave length heat radiation by a solar collector. A solar collector typically consists of an open or transparent face of admitting solar radiation and internal structure for receiving and transforming the radiation to useful energy.

In order for the solar collector to receive a maximum energy input it must be continuously directed toward the sun and thus is operated most efficiently when equipped with a device designed to track the sun as it travels across the sky.

Many types of tracking devices have been provided to accomplish this function. For example, some devices consist merely of a time actuated servo-motor which moves the solar collector through an arc about a fixed axis. However, problems are encountered due to the fact that the physical points of sunrise and sunset on the horizon and the times thereof, vary nonlinearlly throughout the year.

Tracking systems with photo electric sun sensing devices have also been used. These devices generally overcome problems associated with the transient and nonlinear nature of the sun's path, but encounter problems with the reduced sunlight conditions caused by clouds and the like. Such systems must generally be directed toward the point of sunrise to begin the tracking function and return to this orientation when the sky becomes sufficiently dark at dusk. However, clouds may create a lighted condition similar to dusk thereby causing the unit to return to the easterly starting orientation where it remains until reactivated the next morning. In more sophisticated models the unit may pivot between the sunrise position and the sun oriented position in response to the passage of a dark cloud. Both conditions cause loss of sun time and waste energy in the needless operation of the servo-motor. Thus a need exists for a solar tracking system capable of overcoming these problems.

A self adjusting solar energy unit might be particularly useful in ranching and similar operations where there is often a need for an electricity generating unit in a remote or inaccessible area which is not serviced by utility lines. Pumping well water to a stock tank in a remote area is a typical problem. A solar energy generating unit capable of powering a pump motor might be used to overcome such problems. Such a unit should be self operating and should be provided with a sun tracking for obtaining maximum efficiency from the solar energy generating unit.

SUMMARY OF THE INVENTION

The present invention comprises a solar energy recovery system employing a novel tracking system which may be used in combination with various solar energy generating units for obtaining an extremely efficient conversion of available solar energy to other forms of energy. The tracking system may also be used with other sun sensitive devices and "solar collector" as used herein is used in a broad sense to include all such sun sensitive devices. The solar tracking system comprises a sun sensing means for actuating a servo-motor which causes an operably attached solar collector to be periodically repositioned in the direction of the sun. The sun sensing means uses the presence and absence of shadow created by the sun's relationship to a shroud device to alternately switch the servo-motor on an off in response to the sun's movement. A secondary "blind" system using a light intensity sensing means is provided and coordinated with the first whereby during periods of cloud cover the servo-motor is actuated to continue to move the system from an easterly to a westerly direction at a rate approximately that of the sun's movement until the sun again reappears and the light sensing system overrides the secondary system.

In one embodiment the solar tracking system is used in combination with a parabolic solar collector which may be used to heat water or other heating medium to a vaporized or partially vaporized state for use in driving a steam turbine to produce electrical energy. The electrical energy thus produced may be stored in storage batteries and used to operate a well pump or the like. Energy from the storage battery may be used to provide operating current for the solar tracking system.

In another embodiment the solar tracking system is used with a solar panel containing photoelectric cells. The photoelectric cells generate electrical energy which is supplied to a storage battery whicn in turn supplies energy to an electric air compressor. The compressor in operated during hours of sunlight to supply compressed air to an air storage tank. The compressed air may be dried in a chemical air dryer prior to storage and used as needed to drive an air motor generator or alternator to provide electrical energy to a well pump of the like.

Actuation of the well pump in both the turbine and compressed air systems is controlled by a switch valve located in a stock tank whereby the pump motor is operated only as needed.

Thus, it is an object of the present invention to provided a highly efficient solar tracking system which may be used in combination with a solar energy generating unit or other sun sensitive system.

It is a further object of the present invention to provide a solar tracking system and solar energy generating unit which may be used in remote areas.

It is a further object of the present invention to provide a solar tracking system and solar energy generating unit which is self operating and requires little maintenance or adjustment.

BRIEF DESCRIPTION OF THE DRAWING

An illustrative and presently preferred embodiment of the invention is shown in the accompanying drawing in which.

DETAILED DESCRIPTION OF THE INVENTION

Figure 1:
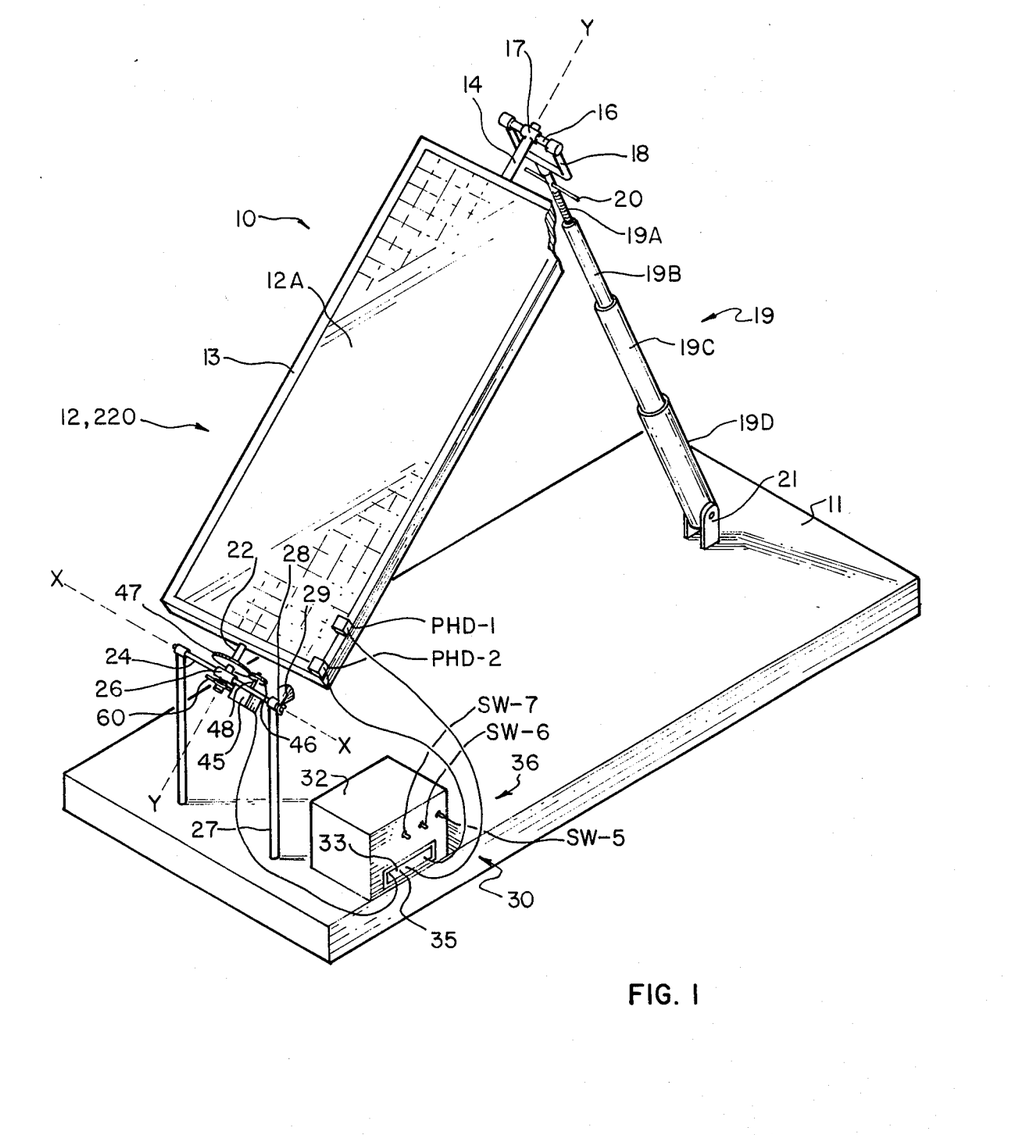
FIG. 1 is a perspective view of a solar collector unit mounted with a solar tracking system.

The connection and mounting of the solar tracking system 10 on a solar collector unit 11 is illustrated in FIG. 1. The solar collector unit may be of a variety of types such as, for example the photoelectric panel 220 illustrated in FIG. 1 and FIG. 7 or the parabolic trough collector 112 illustrated in FIGS. 2 and 8. The collector 12, having a sun facing face portion 12A, is supported by centrally positioned upper and lower mounting shafts 14 and 22 which are rigidly mounted in coaxial alignment on the collector frame 13. The upper mounting shaft is in turn pivotally mounted on a telescoping vertical support leg 19 as by pivotal coupling member 17, upper horizontal shaft 16 and U-shaped pivot bracket 18. The telescoping support leg 19 is retained in position by frictional contact between its component members 19A-19D and may be raised or lowered with the aid of a horizontal handle member 20 rigidly mounted thereon. The lower end of the telescoping support leg lower component 19D is pivotally mounted on a base member 11 as by pivot bracket 21. The collector lower mounting shaft 22 is similarly mounted about a horizontal shaft 24 by pivot member 26. The horizontal shaft 24 is in turn pivotally mounted on two forward vertical support legs 27. The solar collector 12 may thus be rotated about horizontal axis XX defined by the longitudinal axis of lower horizontal member 24. The collector 12 may also be rotated about axis YY defined by the coaxial longitudinal axes of collector upper and lower mounting shafts 14, 22. Rotation about axis XX allows the collector to be periodically adjusted to compensate for the changing height of the sun's path from month to month. Date plate 28 positioned perpendicular to axis XX and fixedly attached to one of the forward vertical legs 27 may be inscribed with angles corresponding to the proper collector position for various calendar dates. Generally, one operating position for each month provides sufficient operating accuracy. Horiziontal shaft 24 which rotates with the collector 12 is provided with a fixedly attached dial indicator 29 for aligning the collector 12 with the correct plate inscription.

Rotation about axis YY allows the collector 12 to be positioned directly towards the sun as it passes across the sky from east to west. The collector 12 is rotated about axis YY by rotation means such as a servo-motor, 45 and associated drive gears 46, 47 mounted on servomotor drive shaft 48 and lower collector shaft 22 respectively. The operation of the rotation means is controlled by a control unit 30 which may be mounted on base 11 by conventional attachment means.

As illustrated by FIG. 1, the electrical control unit 30 of the solar tracking system 10 may be provided with a box type housing 32. The housing 32 is provided with electrical connected means such as female receptical 33 and male receptical 35 having electrical leads 36, for connecting components within the housing 32 to external components.

For purposes of clarity with reference to FIGS. 2-7 the various types of electrical components used have been abbreviated as follows: Phototransistor—PHD, Timer—TM, single pole single throw relay, commonly referred to as an SPST Relay—RLY, Resistor—R, radio frequency choke, commonly referred to as R F Choke—RFC, Silicon Controlled Rectifier—SCR, Electronic Gate—G, Switch—SW, Wire—W. Each component has also been assigned a reference numeral for indicating its position in the circuitry, such as SW-2, PHD-1, etc.

The solar tracking a system of the present invention has two different tracking modes which are used during different conditions. The system modes are interelated by the control circuitry and thus automatically switch in and out as determined by external conditions.

Figure 3:
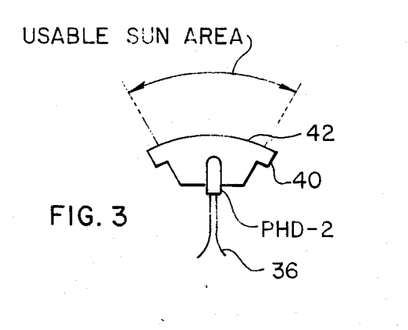
FIG. 3 is a detail elevation view of a light intensity sensing phototransistor.

The two modes may be designated generally as a sunlight following mode and a blind mode. The sunlight following mode utilizes sun position sensing means to follow the sun and is used during periods of bright sunlight. The blind mode is sensitive to the intensity of sunlight and generally switches in during periods or reduced sunlight as when clouds cover the sun and actuates the servo-motor 45 during such periods in response to time based control signals A light intensity sensing means such as photo transistor, PHD-2, is provided at some point on or near the face of the solar collector as shown by FIG. 1 for measuring the quantity of available sunlight. As shown by FIG. 3, Photo transistor PHD-2 is enclosed in a housing 40 having a clear convex shaped face 42 capable of detecting sunlight over a relatively large angle on the order of 70°-80°. Wire leads 36 connect PHD-2 with male receptical 35 and control box 30.

Figure 5:
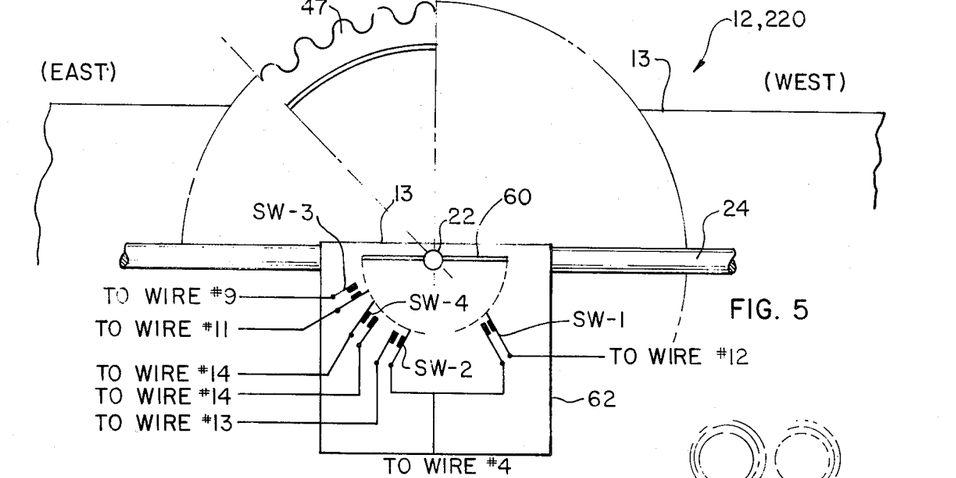
FIG. 5 is a detail end elevation view of a solar collector and switching assembly.
Figure 6:
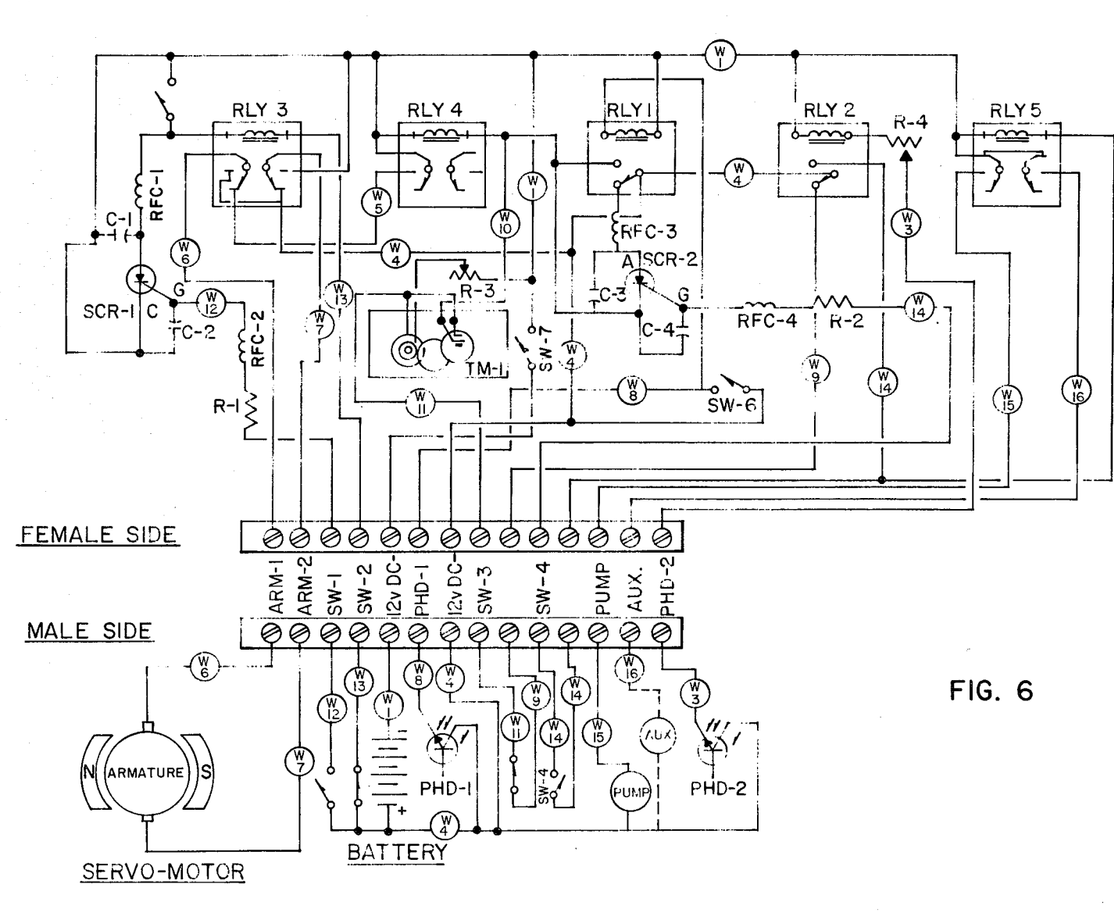
FIG. 6 is a schematic drawing of the control circuitry of the control unit of the tracking system of FIG. 1.

As illustrated by FIG. 6, the control circuitry is provided with electrical energy by a battery means such as battery 15 which may be a 12 volt battery. When an acceptable amount of solar energy (heat and light radiation) is available, phototransistor PHD-2 will pass current through wire W-3 and variable resistor R-4, to SPST relay RLY-2 and wire W-1 thus activating RLY-2. Variable resistor R-4 is used to vary the amount of light which activates RLY-2. Actuation of RLY-2 allows current to flow from wire W-4 through wire W-14, RLY-2, and level switch SW4. Switch SW-4 is operated by the rotating switch arm 60 and switch plate assembly 62 as shown in FIG. 5 and is closed in the morning position, but is otherwise normally open. In regard to the remainder of the circuit formed by OHMS resistor R-2 and axial lead RF choke RFC-4 into silicon-controlled rectifier SCR-2, SCR-2 will only conduct electricity when a trigger voltage is momentarily applied to gate G. However, once triggered, the current will continue to flow until the circuit is broken. Current flows through W-4, RLY-1, RFC-3, gates A and C of SCR-1 and into RLY-4 triggering this relay. Current will then flow from wire W-1 and wire W-6 through RLY-4, RLY-3 and wire W-5 and into the DC servo-motor 45 mechanically connected to the collector 12. From the DC servo-motor 45 the current will flow through wire W-7 and RLY-3 and again to wire W-4. Thus a completed circuit is formed which allows the servo-motor 45 to rotate the collector 12. The collector will continue to be rotated by the servo-motor 45 until sun sensing phototransistor sensor PHD-1, mounted on the collector 12 as shown by FIG. 1, "finds the sun" and stops the flow of current to the motor 45.

Figure 4:
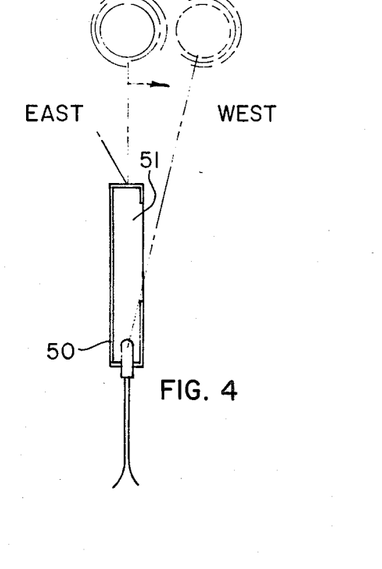
FIG. 4 is a detail elevation view of a light sensing phototransistor mounted in a shroud.

The manner in which PHD-1 "finds the sun" will now be described. PHD-1 is mounted on or near the face of the solar collector 12 and is periodically rotated therewith by the servo-motor 45 in an east to west arc during hours of sunlight. As illustrated by FIG. 4, PHD-1 is enclosed in a housing or shroud 52 which is opaque to the sun's rays except on westerly oriented face 51. Thus the sun's rays do not strike PHD-1 so long as the solar collector and the shroud 52 are pointed directly towards the sun as illustrated by the solid lines in FIG. 4. This position wherein the shroud 51 is pointed directly at the sun and PHD-1 is positioned in the shroud's shadow corresponds to "finding the sun". In this position PHD-1 does not permit a flow of current through wire W-3, thereby allowing current to flow through wire W-4, to wire W-8 and RLY-1 to wire W-1. This will trigger RLY-1, breaking current through SCR-2 deactivating it and RLY-4, which in turn cuts power to the servo-motor 45 stopping the rotation of the solar collector 12 at a position where it is pointed directly into the sun. However, as the sun moves across the sky in a westerly direction it will eventually shine on PHD-1 once again thus triggering RLY-4 as described above allowing a flow of current to servo-motor 45. When the motor 45 has rotated the collector a sufficient distance, the shroud 50 will once again cast a shadow on PHD-1, again triggering RLY-1 to cut the current flow to the servo-motor 45. This sequence will continue until the sun sets or clouds cover the sun. The latter condition will prevent the described sun sensing system from operating properly, however, at this point the "blind mode" becomes operational to maintain the solar collector 12 orientation as closely as possible to the sun's actual position. This blind mode operation increases overall efficiency significantly during highly variable days. The blind mode is activated when the light level on PHD-2 drops enough to deactivate RLY-2 and RLY-5. The deactivation level depends on the resistor R-4 setting for the particular application. This deactivation of RLY-2 allows current to flow from wire W-4 through RLY-2, W-9, SW-3, wire W-11 to timer TM-1. (When the collector is in the morning or "off" position, SW-3 is open preventing the timer RM-1 from operating.) From TM-1 current flows to a stationary contact and through the timer internal control motor (not shown) to R-3 and wire W-1. The timer TM-1 is now running and has an activation frequency dependent on R-3 setting which adjusts the speed of the timer internal control motor (not shown). The timer motor is gear reduced to a switchable contact rotating plate (not shown) which provides periodic current flow to servo-motor 45. The timer TM-1 when activated (contacts closed) allows current to flow from wire W-11 to W-10, Rly-4 and wire W-1 activating RLY-4. RLY 4 supplies current to RLY-3 through wire W-5 and the servo-motor 45 as previously described. Thus the servo-motor 45 is periodically actuated in the blind mode, the periods of actuation being of predetermined duration to move the collector in intervals which maintain its orientation towards the sun. The collector 12 is then able to move in relation to the sun without actually "seeing it". If the sky does clear to allow sufficient light intensity for the PHD-2 setting, the timer will be deactivated and the sunlight tracking of PHD-1 will again take over.

Upon completion of the solar arc across the sky, SW-1 is closed by switch arm 60 allowing current to flow from wire W-4 through wire W-12 (R-1, RFC-2, into SCR-1) which triggers SCR-1 to allow current to flow from wire W-1 through SCR-1 RFC-1, RLY-3 and SW-2 back to wire W-4 via wire W-13. SW-1 is normally open, but only closes momentarily to trigger SCR-1 and is dependent on the collector 12 position.

As RLY-3 activates, it will reverse the current supplied to the DC servometer 45 through wire W-4 to wire W-6 and wire W-1 to wire W-7 causing the tracking platform to move backwards.

The servo-motor 45 continues to operate in the reverse direction until SW-2 opens when triggered by the switch arm 60 platform, as illustrated by FIG. 5, breaking the current flowing through SCR-1 and RLY-3 thereby deactivating both. At this time the entire system is ready for the next day's sunrise.

This is the complete sequence for a solar day. Two other switches SW-5 and SW-6 and the main power switch SW-7, are also provided on the control box 30, FIG. 1. The switches SW-5 and SW-6 are override switches, wire W-1 to wire W-13 and wire W-8 t wire W-4, which activate RLY-3 or RLY-4 to supply current to the servo-motor 45 for initial orientation and testing. The fifth relay RLY-5 in this circuit is activated by RLY-2 only when there is enough light available. RLY-5 is responsible for supplying current to the circulation pump of solar energy generating unit 100 (discussed below) through wire W-4 to wire W-15, or to other alternate functions through wire W-4 to wire W-16, that required for a particular solar receiver operation.

The solar tracking system 10 described above can be adapted for use with most solar panels or other collectors and will increase the efficiency of such units.

Figure 8:
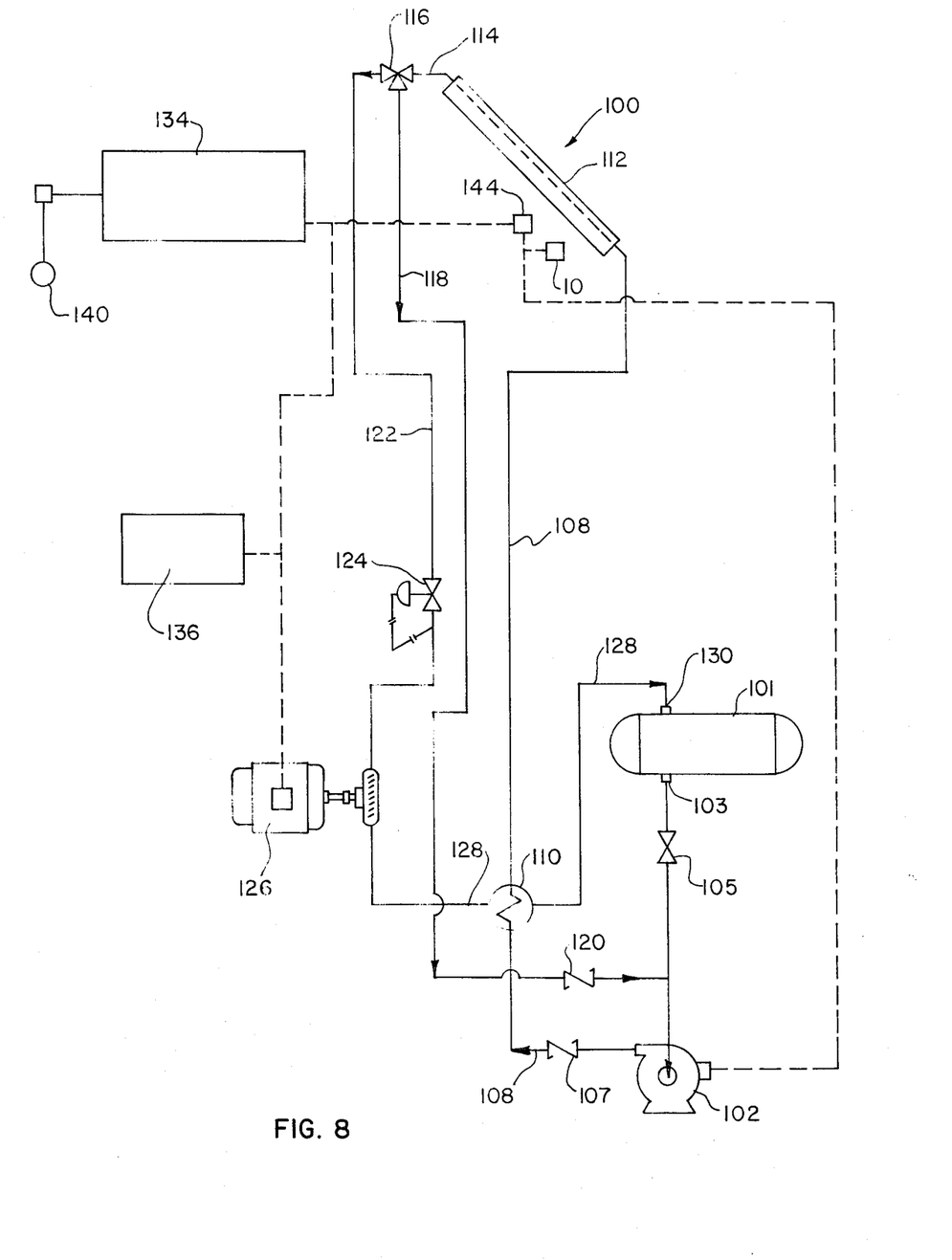
FIG. 8 is a schematic drawing of another solar electric generating unit.

In the solar energy generating unit 100 illustrated schematically in FIG. 8 the solar tracking system 10 is provided in combination with a solar collector to generate electric energy with a steam turbine unit 126. The energy provided by the turbine 126 may be used to drive a well pump 134 to supply a stock watering tank (not shown) or the like.

Heat medium such as water is stored in a heat medium surge tank 101. The tank must be of sufficient size to ensure adequate pump suction head in a circulation pump 102 which is connected in fluid communication with the tank discharge orifice 103 through shutoff valve 105. The size of the pump 102 will, of course, depend on the size of the system and heat medium used, for example, in a water medium system for conventional stock tank use, a Gorman-Rupp Industries Pump Model NO. 25501-001 might be used. The circulation pump discharge passes through a one-way check valve 107 into main circulation line 108 and therethrough into the heating coil of preheater 110 wherein the temperature of the liquid medium is raised by heat exchange with turbine discharge fluid, as discussed in further detail below. The preheater may be any type of closed system heat exchanger of suitable size such as Packless Industries Exchanger—Model No. HXR-25. The heat medium thereafter continues to flow through line 108 into the lower portion of a solar heating means such as parabolic trough solar collector 112.

Figure 2:
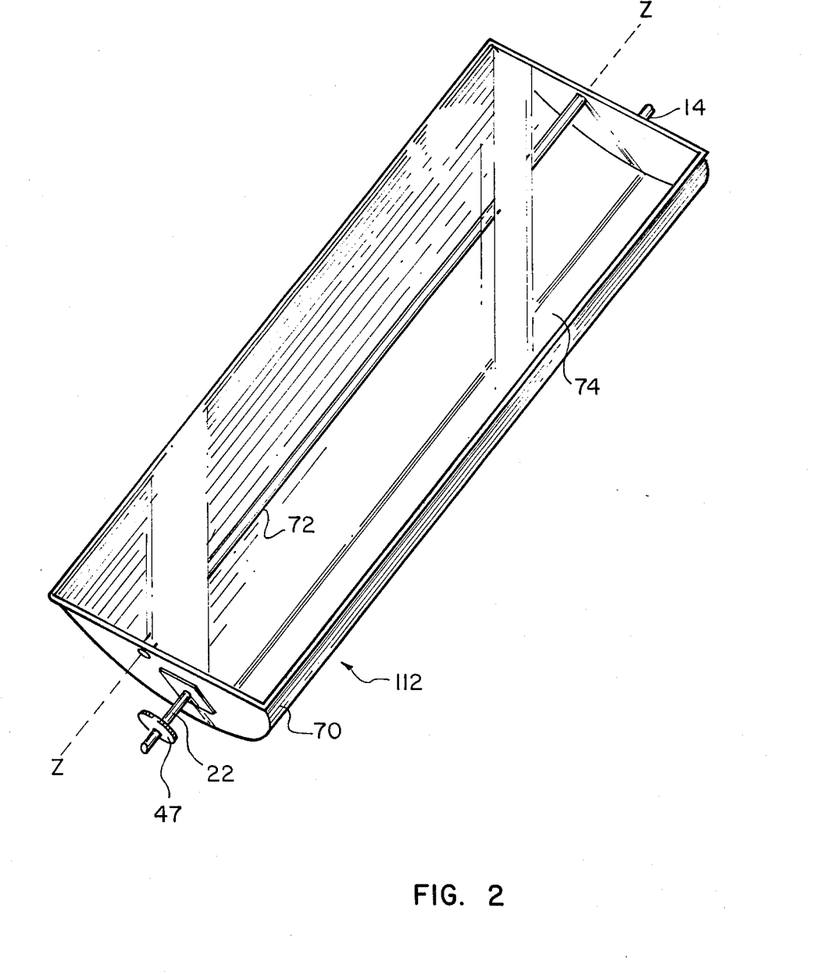
FIG. 2 is a perspective view of a parabolic trough solar collector.

As illustrated by FIG. 2, the parabolic trough solar collector 112 comprises a parabolic trough to having a heating conduit 72 positioned along on axis ZZ defining a focal line of the trough 70. Fluid passing through conduit 72 is thus heated through contact with the conduit walls. A clear panel 74 may also be provided on the open portion of the trough 70 to protect the interior surface thereof.

After being heated in the solar heating means the fluid passes through solar heater discharge conduit 114 into two-way temperature control valve 116, such as an Amot Thermostatic valve. Temperature control valve 116 is set at a predetermined operating temperature and discharge fluid entering the valve 116 below the preset temperature is directed through recycle conduit 118 and one-way valve 120 to the inlet orifice of circulation pump 102. Thereafter it is again passed through the preheater 110 and solar collector 112. This process is repeated until the fluid temperatures is raised above the preset temperature of the control valve 116. Fluid entering the control valve 116 at above the present temperature is directed through a second outlet orifice into steam turbine line 122. The steam turbine line 122 is provided with a pressure control valve 124, such as a Fisher-67F valve or the like, which monitors downstream pressure thereby providing heated fluid at a constant pressure to a turbine power generator means such as steam turbine alternator or generator 126. The fluid, after energy transfer to the turbine blades, passes into return line 128 and thereafter, through preheater 110 where its temperature is further reduced by heat exchange with circulation line fluid passing therethrough. The fluid thereafter passes through return line 128 and discharges into surge tank inlet 130 to begin a new cycle.

As discussed above, the turbine unit 126 may be either an alternator or generator unit for operating an AC or DC well pump unit 134, operably attached thereto by convention electric circuitry. Turbine unit 126 is also operably electrically connected to storage battery means 136 which stores energy for operation of well pump 134, circulation pump 102, and the servo-motor of the solar tracking unit 10. Energy for pumping water is thus available even during hours of darkness or reduced light. The typical storage battery unit will have a storage capacity sufficient for three to five days of operation during cloudy periods.

The operation of the water pump motor 134 is controlled by a level float switch 140 operably positioned in a stock water tank (not shown). When the water in the stock tank reaches a preselected level, the float switch 140 opens the circuitry to well pump 134. As the water descends below a preselected level, the level float switch 140 again closes the circuit to start the well pump 134. The level float switch 140 may be of a number of conventional models well known in the art. The flow of electricity from storage battery 136 to circulation pump 102 is controlled by circulation pump control unit 144 whereby the circulation pump may be permitted to operate only during periods of sufficient sunlight. To accomplish this end, the control unit may be provided with photoelectric light sensing means (not shown) which actuate the motor only when the intensity of sunlight has reached a preselected level. This photoelectric means may be provided by control circuitry in the sun tracking system 10 described above or other photoelectric means may be used. It is also possible to use the described solar energy generating unit 100 without the sun tracking system 10 as with a fixed solar collector 112, although the system would be less efficient.

Figure 7:
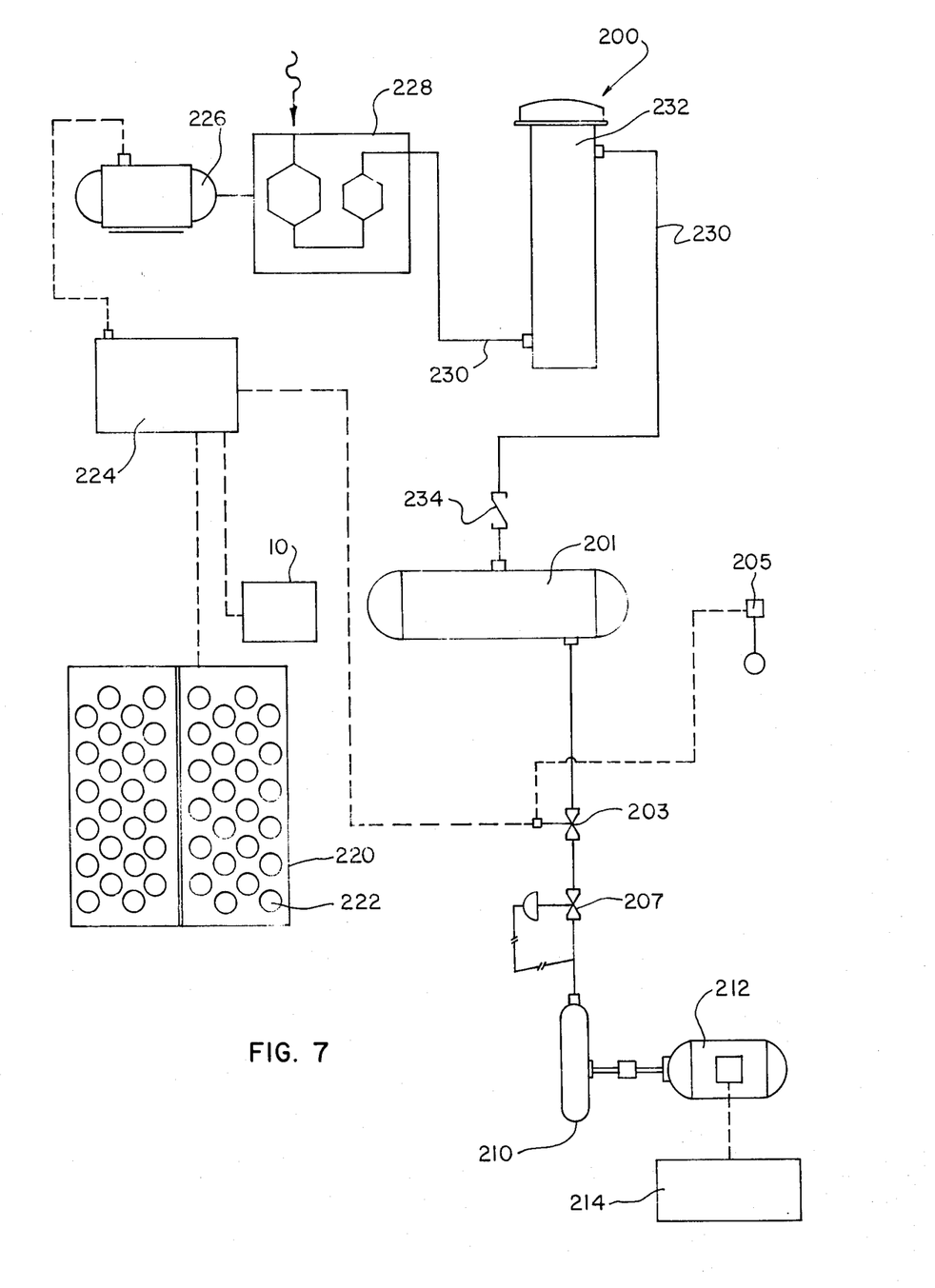
FIG. 7 is a schematic drawing of a solar electric generating unit.

In another embodiment of the invention as illustrated in FIG. 7, a solar energy generating unit 200 utilizes the sun tracking system 10 to generate energy which is stored both in electric storage batteries and in compressed air. In this system 200, the unit is initially started up by a discharge of compressed air from air storage tank 201. Air from the storage tank passes through a normally closed solenoid control valve 203 which is actuated by level float switch 205 positioned in a stock water tank (not shown). The float switch 205 actuates the valve 203 into the open position when the water level in the tank has fallen below a predetermined level. Air discharging through the solenoid control valve 203 communicates with the inlet of pressure control valve 207. The pressure control valve 207 provides pressurized air at a constant power output to will pump motor 214. The pump 214 is operated continuously until level float switch 205 reaches a redetermined level actuating solenoid control valve 203 into a closed position thereby cutting off the air supply to the air motor 210 and thus well pump 214. Energy to provide compressed air to air storage tank 201 is provided by solar panel 220 equipped with photoelectric cells 222 and mounted on the solar tacking system 10 as illustrated in FIG. 1 and described above. The photoelectric cells 222 convert sunlight into electrical energy which is transmitted to storage batteries 224. The storage batteries are, in turn, used to provide energy for the operation of the sun-tracking system 10, the solenoid control valve 203 and the electric motor unit 226. The electric motor unit 226 is operably attached to an air compressor unit 228 which receives ambient air and discharges pressurized air through air pressure conduit 230 into chemical air dryer 232 of a conventional, commercially available type and thereafter through one-way valve 234 into air storage tank 201. The advantage of an air storage system over a pure battery storage system lies in the fact that the air may be stored for an almost unlimited period of time whereas energy stored in battery units tends to leak off after a few days duration.

It is contemplated that the inventive concepts herein described may be variously otherwise embodied and it is intended that the appended claims be construed to include alternative embodiments of the invention except insofar as limited by the prior art.

What is claimed is:

1. A solar tracking system comprising:
   a. solar collector means for receiving radiant energy from the sun said solar collector means comprising a face portion said solar collector means receiving maximum energy input when said face portion is directed directly toward the sun;
   b. base means for mounting said solar collector means and other tracking system components;
   c. first pivotal mounting means for mounting said solar collector means whereby said solar collector means may be pivotal about a first pivot axis between an easterly and a westerly orientation to follow the path of the sun;
   d. servo-motor means operably attached to said solar collector means for drivingly rotating said collector means about said first pivot axis;
   e. control means for actuating said servo-motor in a forward or reverse direction;
   f. sun sensing means for sensing the relative position of the sun with respect to said face portion of said solar collector means operably mounted on said face portion, said sun sensing means providing electric control signals to said control means in response to the movement of the sun whereby said face portion of said collector means is periodically redirected toward the sun;

g. light intensity sensing means operably mounted on said face portion for providing control signals to said control means at a preselected level of sunlight intensity whereby said control means actuated said servo-motor to rotate said solar collector means for an easterly to a westerly orientation at a predetermined rate independent of the position of the sun when the intensity of the sunlight is below said preselected level, and wherein said control means actuates said servo-motor in response to signals from said sun sensing means when the intensity of sunlight is above said preselected level;

h. sunset switching means for overriding said sun sensing means and said light intensity sensing means for providing a control signal to said control means when said solar collector means has rotated to a position corresponding to the sunset position of the sun whereby said control means actuates said servo-motor to return said solar collector to a position corresponding to the sunrise position of the sun;

whereby said solar collector is positioned at a predetermined sunrise position at the beginning of each solar day, follows the sun from sunrise to sunset during bright snlight or cloud cover conditions and returns to the predetermined sunrise position at sunset;

wherein said sun sensing means comprises a first phototransistor means for generating an electric signal and a shroud means for enclosing said first phototransistor means;

wherein said shroud means comprises a regular parallel piped having a first face fixedly positioned on the face of said solar collector means and a second transparent face positioned in a westerly facing direction wherein direct sunlight strikes said first phototransistor means only by passing through said transparent westerly oriented face;

wherein said light intensity sensing means comprises a second phototransistor means for generating an electric signal, the intensity of which is dependent on the intensity of sunlight;

wherein said second phototransistor means comprises an enclosing means having a convex transparent face for receiving sunlight from a direction generally perpendicular to said face portion of said solar collector and from angles substantially divergent therefrom;

wherein said solar collector means comprises a parabolic trough solar collector;

wherein said parabolic trough solar collector is operably connected to a solar energy generating unit comprising:

heat medium for energy transfer;

a heat medium surge tank for holding said heat medium;

circulation conduit means in communication with said surge tank for circulating said heat medium;

circulation pump means operably communicating with said circulated conduit means for circulating said heat medium therethrough;

preheating means operably positioned about said circulation conduit means for preheating the heat medium therein downstream said circulation pump means;

said parabolic trough collector attached in fluid communication with said circulation conduit means downstream said preheating means for further heating said heat medium;

two way temperature control valve means having a first and second outlet for selectively directing said heat medium through a recirculation conduit means or a turbine conduit means in response to heat medium temperature in communication with said parabolic trough collector;

recirculation conduit means in fluid communication with said a first outlet of said two-way temperatures control valve means and said circulation pump means;

turbine conduit means in fluid communication with said second outlet of said two-way temperature control valve means;

pressure control valve means in fluid communication with said turbine conduit means for providing a constant downstream pressure therein;

turbine means for generating electric current operably positioned in fluid communication with said turbine conduit downstream said pressure control valve;

return line conduit means in fluid communication with said turbine means and said heat medium surge tank for returning said heat medium to said surge tank said return line means being operably connected to said preheater means for providing heat transfer between said return conduit means and said circulation conduit means.

* * * * *